(12) United States Patent
Li et al.

(10) Patent No.: US 11,398,180 B2
(45) Date of Patent: Jul. 26, 2022

(54) DISPLAY CONTROL SYSTEM AND DISPLAY DEVICE

(71) Applicant: APPOTRONICS CHINA CORPORATION, Shenzhen (CN)

(72) Inventors: Yi Li, Shenzhen (CN); Zeqin Wang, Shenzhen (CN)

(73) Assignee: APPOTRONICS CORPORATION LIMITED, Shenzhen (CN)

(*) Notice: Subject to any disclaimer, the term of this patent is extended or adjusted under 35 U.S.C. 154(b) by 0 days.

(21) Appl. No.: 15/313,544

(22) PCT Filed: May 29, 2015

(86) PCT No.: PCT/CN2015/080149
§ 371 (c)(1),
(2) Date: Nov. 22, 2016

(87) PCT Pub. No.: WO2015/180676
PCT Pub. Date: Dec. 3, 2015

(65) Prior Publication Data
US 2017/0200410 A1 Jul. 13, 2017

(30) Foreign Application Priority Data
May 30, 2014 (CN) .......................... 201410240355.8

(51) Int. Cl.
*G09G 3/32* (2016.01)
*G09G 3/34* (2006.01)
(Continued)

(52) U.S. Cl.
CPC ............. *G09G 3/32* (2013.01); *G02B 26/008* (2013.01); *G02B 26/0833* (2013.01);
(Continued)

(58) Field of Classification Search
CPC ...... G09G 3/32; G09G 3/2003; G09G 3/2022; G09G 3/3413; G09G 3/346; G09G 3/3611;
(Continued)

(56) References Cited

U.S. PATENT DOCUMENTS 6,329,971 B2 * 12/2001 McKnight ............ G09G 3/2011
345/208
6,535,187 B1 * 3/2003 Wood ........................ G09G 3/22
345/204
(Continued)

FOREIGN PATENT DOCUMENTS

CN 101038422 A 9/2007
CN 101251645 A 8/2008
(Continued)

OTHER PUBLICATIONS

International Search Report in the parent PCT application No. PCT/CN2015/080149, dated Sep. 7, 2015.
(Continued)

*Primary Examiner* — William Boddie
*Assistant Examiner* — Saifeldin E Elnafia
(74) *Attorney, Agent, or Firm* — Chen Yoshimura LLP

(57) ABSTRACT

A display control system and a display device. The display control system (1) comprises a control unit for controlling a light source (2) to be in a bright field and a dark field alternately in the same frame of data, and controlling the status switching of a light valve of a spatial light modulator (3) to be within the time of the dark field of the light source. The display device comprises the display control system (1). The control unit controls the bright field and the dark field of the light source, so that the light valve of the spatial light modulator (3) has a relatively long switching time, thereby increasing the switching speed of the light valve, reducing
(Continued)

the difficulty for manufacturing the spatial light modulator (3), and improving the accuracy for the spatial light modulator (3) to modulate the light source.

14 Claims, 4 Drawing Sheets

(51) Int. Cl.
  *G09G 3/20* (2006.01)
  *G09G 3/36* (2006.01)
  *H04N 9/31* (2006.01)
  *G02B 26/00* (2006.01)
  *G02B 26/08* (2006.01)

(52) U.S. Cl.
  CPC ......... *G09G 3/2003* (2013.01); *G09G 3/2022* (2013.01); *G09G 3/346* (2013.01); *G09G 3/3413* (2013.01); *G09G 3/3611* (2013.01); *H04N 9/312* (2013.01); *H04N 9/3155* (2013.01); *G09G 2310/0235* (2013.01); *G09G 2310/08* (2013.01); *G09G 2320/0233* (2013.01); *G09G 2320/0242* (2013.01); *G09G 2320/064* (2013.01); *G09G 2320/0633* (2013.01)

(58) Field of Classification Search
  CPC ....... G09G 2310/0235; G09G 2310/08; G09G 2320/0233; G09G 2320/0242; G09G 2320/0633; G09G 2320/064; G02B 26/008; G02B 26/0833; H04N 9/312; H04N 9/3155
  See application file for complete search history.

(56) References Cited

U.S. PATENT DOCUMENTS

| | | | |
|---|---|---|---|
| 2002/0101396 A1 | 8/2002 | Huston et al. | |
| 2002/0180678 A1* | 12/2002 | Taira | G09G 5/02 345/88 |
| 2005/0285818 A1* | 12/2005 | Hashikawa | G09G 3/2022 345/63 |
| 2007/0211218 A1 | 9/2007 | Nitta et al. | |
| 2008/0158442 A1 | 7/2008 | Arai et al. | |
| 2008/0198442 A1 | 8/2008 | Weatherford | |
| 2008/0218438 A1 | 9/2008 | Arai et al. | |
| 2008/0246782 A1* | 10/2008 | Endo | H04N 9/3111 345/690 |
| 2008/0259008 A1 | 10/2008 | Arai et al. | |
| 2009/0051712 A1 | 2/2009 | Arai et al. | |
| 2009/0147033 A1 | 6/2009 | Arai et al. | |
| 2009/0201236 A1 | 8/2009 | Arai et al. | |
| 2011/0043764 A1 | 2/2011 | Narikawa | |
| 2013/0222443 A1 | 8/2013 | Goetz et al. | |
| 2014/0085274 A1* | 3/2014 | Lewis | G09G 3/3433 345/204 |

FOREIGN PATENT DOCUMENTS

| | | |
|---|---|---|
| CN | 102016695 A | 4/2011 |
| CN | 102298903 A | 12/2011 |
| JP | 2011-44367 A | 3/2011 |

OTHER PUBLICATIONS

IPRP in the parent PCT application No. PCT/CN2015/080149, dated Dec. 6, 2016.
Chinese Office Action, dated Jul. 20, 2017 and Search Report dated Jul. 12, 2017, in a counterpart Chinese patent application, No. CN 201410240355.8.
Extended European Search Report, dated May 10, 2017 in corresponding application EP 15799471.6.
European Communication pursuant to Article 94(3) EPC, dated Sep. 20, 2018 in corresponding application EP 15799471.6.
Japanese Office Action, dated Jan. 30, 2018 in a counterpart Japanese patent application, No. JP 2016-570345.
Japanese Office Action, dated Sep. 5, 2018 in a counterpart Japanese patent application, No. JP 2016-570345.
Summons to attend oral proceedings pursuant to Rule 115(1) EPC, dated Jul. 11, 2019 in corresponding application EP 15799471.6.
Result of Consultation, dated Mar. 10, 2020 in corresponding application EP 15799471.6.
Communication pursuant to Article 94(3) EPC, dated Apr. 8, 2020 in corresponding application EP 15799471.6.

* cited by examiner

DISPLAY CONTROL SYSTEM AND DISPLAY DEVICE

BACKGROUND OF THE INVENTION

Field of the Invention

This invention relates to optical technologies, and in particular, it relates to a display control system and display device.

Description of Related Art

Spatial light modulators (SLM) are indispensable components of display devices. In recent years, spatial light modulator technologies have significantly improved. For example, grayscales level differences are realized by modulating the illumination brightness, so that the grayscale display is smoother and have higher resolution.

In current technologies, the requirement of high speed switching for the light valves in SLMs causes difficulties in manufacturing and control. For example, a device is described in Chinese patent application CN 102016695, shown in FIG. 1. The image display is frame by frame, and each frame includes images of the three primary colors red, green and blue. The red, green and blue color laser lights are pulse modulated, to meet the requirements of color and brightness of the red, green and blue color lights for each frame of data. The SLMs include a large number of light valves, and each light valve uses switching to realize the grayscale level of the color for each image pixel of the frame. As shown in FIG. 2, the switching angle of each light valve is ±12°, and the three states during switching are 01, 02 and 03 shown in the drawing. When the input light 201 (which may be any one of the three primary colors red, green and blue) is incident on the light valve, and the light valve is in state 01, the input light 201 is reflected by the light valve to form reflected light 203; in this state, the no light enters the lens 04. When the light valve changes from state 01 to stage 02 and then to state 03, the amount of the reflected light 202 that enters the lens 04 gradually increase. The length of time that the light valve stays in the state 03 (i.e. the On state) determines the grayscale value of the corresponding pixel. By modulating the amplitude of the laser light pulse in FIG. 1 and the switching of the light valves, a display of various contrast is realized. In FIG. 1, by controlling the number of switching and the staying time of the switching (in this technology, it is the time that the light valve moves from state 01 to state 03 in FIG. 2 and then to the stable On state), to realize different grayscale values. This technology solves the problem of image display contrast. However, because the light valve must switch rapidly (otherwise the staying time of the light valve is shortened and so the error of light processing time of the light by the light valve will be large), and because the light valve may experience oscillations for a period of time when switching between the On and Off state, the precision of the time that the light valve is in the On state or the Off state cannot be ensured. Also, because the sum of the highest switching speed and the staying time of the light valve is much higher than 10 μsec per switching, this makes the manufacturing of quality SLMs very difficult, and makes the control of the light valves very difficult.

Therefore, a display control system and display device are needed which can use reduced light valve switching speed, to achieve high precision SLM control and to reduce the difficulty of SLM manufacturing.

SUMMARY

Accordingly, the present invention is directed to a display control system and display which can solve the problem in the conventional technology of low precision of light modulation and the difficulties in manufacturing caused by the need for high speed light valve switching.

In one aspect, the present invention provides a display control system, which includes: a control unit for controlling a light source to be in a bright field and a dark field alternately within a same frame of data, and controlling a switching of states of a light valve of a spatial light modulator to be within a time interval when the light source is in the dark field.

Preferably, time durations when the light source is in the dark field are of equal lengths.

Preferably, the control unit controls a same primary color light source so that durations of its bright field time intervals are a geometric series within each frame of data.

Preferably, the control unit controls a same primary color light source so that brightness values of its bright field time intervals are a geometric series within each frame of data.

Preferably, the control unit controls the light valve of the spatial light modulator to switch states or stay in a state during time intervals when the light source is in the dark field.

Preferably, the control unit controls a pulse width and/or a pulse amplitude of the light source.

Preferably, the control unit controls the pulse amplitude of the light source to change brightness of its output light.

To realize objects of the present invention, in another aspect, the present invention provides a display device which includes: the display control system of any of the above embodiments; at least one light source; at least one spatial light modulator, for receiving and processing image data, and for receiving and modulating light generated by the light source, wherein the spatial light modulator includes multiple light valves.

Preferably, the light source is one that can be modulated.

Preferably, the light source includes a solid state light emitting element and a color wheel; the solid state light emitting element emits an excitation light; and the color wheel includes a substrate carrying a wavelength conversion material, the substrate moves along a predetermined path, and the excitation light sequentially illuminates different locations of the wavelength conversion material.

Preferably, the light source includes at least three solid state light emitting elements; and the least three solid state light emitting elements emit any one of red, green and blue color lights.

Preferably, the light source includes a color wheel and at least two solid state light emitting elements; one of the solid state light emitting elements emits an excitation light, and the color wheel is located on a light path of the excitation light for receiving the excitation light to generate a converted light; and light generated by the one of the solid state light emitting elements is modulated by the spatial light modulator.

Preferably, the at least one spatial light modulator is one spatial light modulator, and the display control system controls the light source to generate three color lights including red, green and blue lights, and controls the spatial light modulator to sequentially modulate the three color lights including the red, green and blue lights.

Preferably, the at least one spatial light modulator are three spatial light modulators; the display control system controls the light source to generate broad spectrum lights or primary color lights, wherein the primary color lights, or primary color lights generated from the broad spectrum lights by light division and combination, are respectively inputted to the three spatial light modulators; and the spatial light modulators modulate the received primary color lights based on grayscale values of the respective primary colors in each frame of data.

In any of the above embodiments, the solid state light emitting element includes one of LD (laser diode) or LED (light emitting diode), or a combination thereof.

In the above embodiments, by controlling the bright field and dark field of the light source using the control unit, the light valves have a relatively long time to perform switching, which reduces the required switching speed of the light valves. This reduces the difficulties in manufacturing, and also improves the precision of light modulation by the spatial light modulator.

DETAILED DESCRIPTION OF PREFERRED EMBODIMENTS

In embodiments of the present invention, the light source being in the bright field refers to the light source being in the On state, and the light source being in the dark field refers to the light source being in the Off state. The spatial light modulators in these embodiments may include liquid crystal display devices or DMDs (digital micromirror devices).

Embodiments of the present invention are described below with reference to the figures. DMDs are used in the descriptions below as examples, and embodiments that use liquid crystal devices as the spatial light modulators can be similarly understood.

Figure 1:
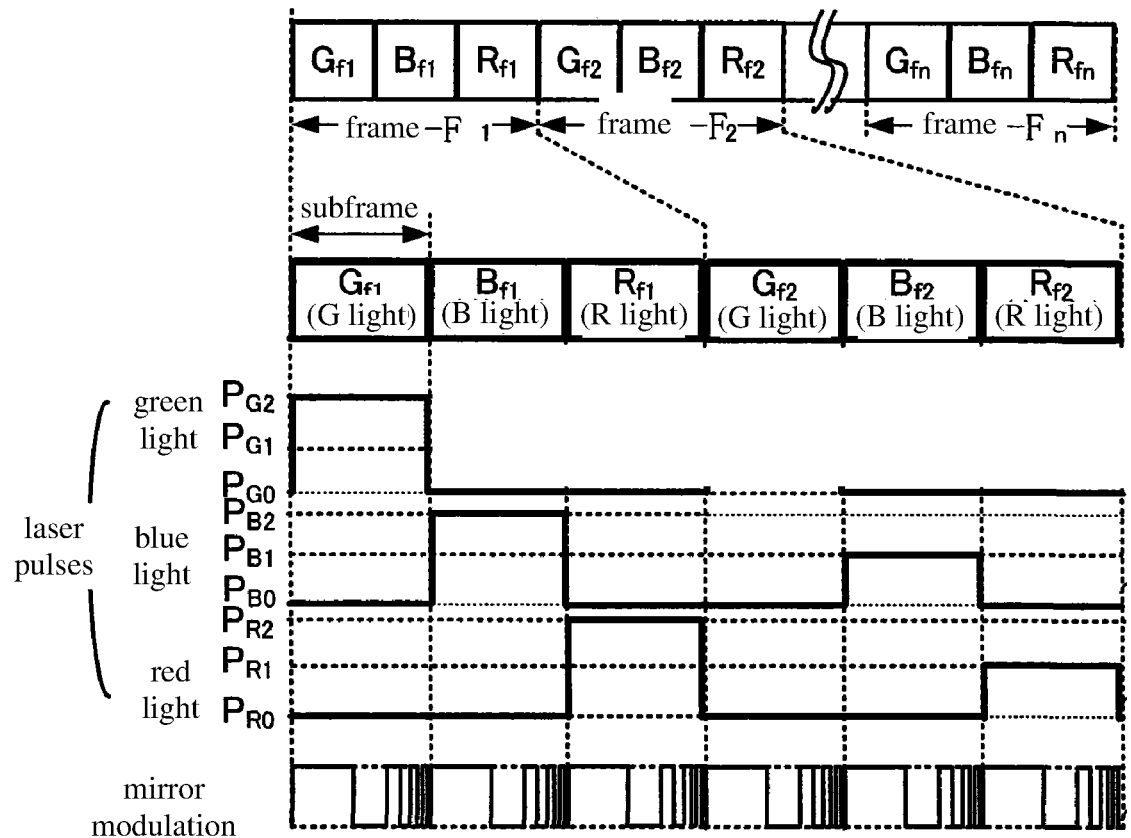
FIG. 1 is a timing sequence of laser light modulation in the convention technology.
Figure 2:
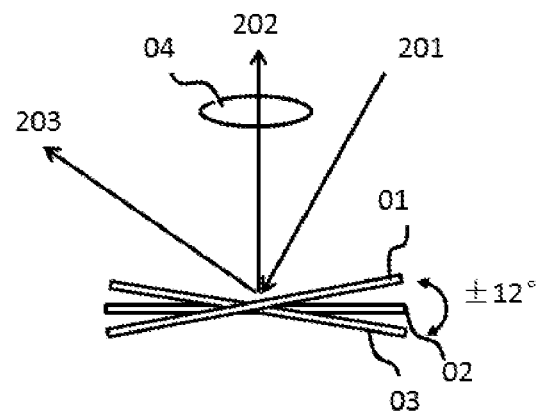
FIG. 2 schematically illustrates the switching of a light valve in the convention technology.
Figure 3:
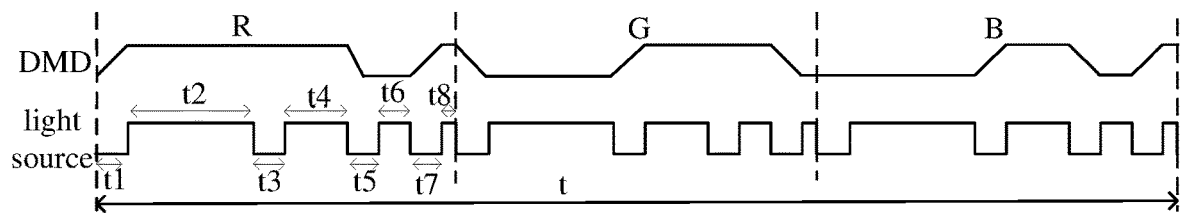
FIG. 3 is schematic diagram illustrating the control of the light source and the spatial light modulator by the display control system according to a first embodiment of the present invention.

A first embodiment of the present invention is described with reference to FIG. 3. The display control system includes a control unit, which controls the light sources to alternately be in bright fields and dark fields, and controls the spatial light modulator. The time durations when the light sources are in the dark field may be equal lengths or unequal lengths. Preferably, the time durations when the light sources are in the dark field are equal lengths. Referring to FIG. 3, the light sources are controlled by the control unit to alternately be On and Off. A spatial light modulator that includes one DMD is used as an example, and FIG. 3 illustrates the switching of one light valves of the DMD. Within a frame of data (also referred to as a frame of image or a frame of image data; a frame of data may be the time duration of the data of the three primary colors red, green and blue as shown in FIG. 3, or the time duration of the data of one color as shown FIG. 6), the light sources emits three primary color lights red, green and blue according to a time sequence; the DMD is controlled by the control unit to sequentially modulates the three primary color red, green and blue lights. When the light source emits the red light, the control unit controls the light source to be Off during time intervals t1, t3, t5 and t7, and to be On during time intervals t2, t4, t6 and t8. The time intervals t1, t3, t5 and t7 when the light source is Off are of equal lengths, i.e. the time intervals when the light source is in dark field are of equal lengths. The light valve of the DMD may perform switching during time intervals t1, t3, t5 or t7. For example, during the time interval t1, the light valve switches from the Off state to the On state. The time duration of the dark field is not limited to particular lengths; the longer the dark field time duration, the slower the switching speed of the DMD light valve can be, but the light utilization efficiency of the light source is reduced correspondingly. The modulation of the green or blue lights of a frame of data shown in FIG. 3 is similar and not described in detail here. In this embodiment, the switching speed of the DMD light valves may be uniform or non-uniform; the switching time of the DMD light valves may be shorter than the duration of the dark field of the light source (such as within time interval t5), or equal to the duration of the dark field of the light source, without limitation. Compared to conventional technologies, where the shortest sum of the switching time and the staying time of the DMD light valves is only the length t8, in this embodiment, the DMD light valves may perform switching during the dark field of the light source, so that during the bright field of the light source, the DMD light valve is already stabilized, which improves the light modulation precision of the DMD. Further, the required switching speed of the DMD is significantly reduced, which significantly lessens the manufacturing difficulties of the spatial light modulators.

FIG. 3 only illustrates one of the embodiments, and there is no limitation on the colors of the lights emitted by the light sources or the color sequence of the output light. For example, the light emitted by the light sources may additionally include colors other than the three primary colors, such as a light sequence of red, blue, yellow, green, or red, green, blue, cyan, etc. When the output lights of the light sources include other colors in addition to the three primary colors, the color gamut and brightness of the image display can be simultaneously enhanced.

In this embodiment, the control unit controls the same primary color light source so that the durations of their bright field time intervals are a geometric series within each frame of data. Assume that the grayscale is 4 bits, i.e. the number of displayable grayscale values for the image is $2^4$. As shown in FIG. 3, within the same frame of data, when the light source emits a red light, the time durations when the light source is in the bright field are sequentially: $2^3*(t/3-4t1)/15$, $2^2*(t/3-4t1)/15$, $2^1*(t/3-4t1)/15$, and $2^0*(t/3-4t1)/$ 15. In other words, when the light source is binary, the common ratio of the durations t2, t4, t6 and t8 is 2, i.e., the common ratio of the light source's pulse widths t2, t4, t6 and t8 is 2. Of course, the order of the time intervals t2, t4, t6 and t8 can be exchanged, such as t2, t8, t4 and t6; such a sequence is still a geometric series if they were reordered.

Figure 5:
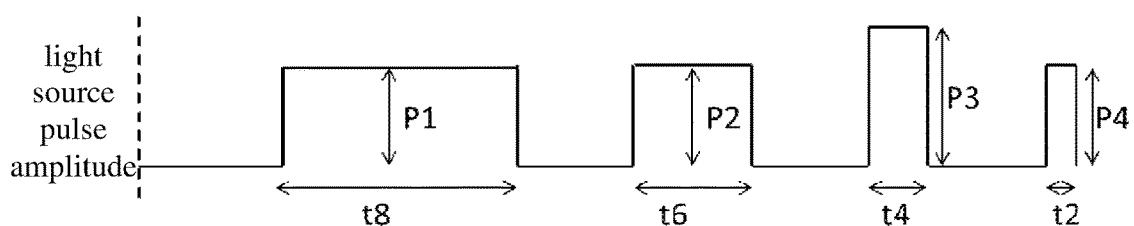
FIG. 5 is another schematic diagram illustrating the control of light pulses of the light source by the display control system according to a first embodiment of the present invention.

In this embodiment, the control unit controls the same primary color light source so that the brightness values of their bright field time intervals are a geometric series within each frame of data. The waveforms of the light sources controlled by the control unit include, without limitation, rectangular waves, triangular waves, sine waves, etc. The brightness of the light source in the bright field is proportional to the area of the waveform. Here, using rectangular waves as an example: the brightness of the light source in the bright field=pulse width of the light source*pulse amplitude of the light source. As shown in FIG. 5, using a 4-bit grayscale as an example, the brightness values of the light source of the same color in the bright field within each frame of data is: P1*t8, P2*t6, P3*t4 and P4*t2, where $P1*t8=2^1*P2*t6=2^2*P3*t4=2^3*P4*t2$. FIG. 5 only illustrates a preferred embodiment. For the same primary color light within each frame, the order of the brightness values of the light in the bright field may be changed, for example, the order of the time intervals may be: t6, t2, t8, and t4, etc. Such a sequence is still a geometric series if they were reordered.

FIGS. 3 and 5 only illustrate the example of switching and light source control when the grayscale is 4 bits. The number of grayscale bits is not limited in this invention. Because the required DMD light valve switching speed is significantly reduced, the grayscale may be 8 bits, 10 bits, 16 bits, 32 bits, etc. The larger the grayscale, the larger the number of displayable grayscale levels, and the clearer the image. Thus, in embodiments of this embodiment, by reducing the required switching speed of the DMD light valves, the grayscale can be enlarged and the image display clarity improved. In this embodiment, the light sources are modulated light sources, i.e., their pulse widths and/or amplitudes can be modulated. Preferably, the light sources are those that can be modulated at a frequency of at least 1000 Hz. Such light sources are presently available, such as solid state light emitting elements, which can be controlled by the control unit to rapidly switch between On/Off states. The solid state light emitting elements are preferably LDs (laser diodes) or LEDs (light emitting diodes) or combinations thereof. Of course, with the development of technologies, other light sources that meet the switching frequency requirements may be available. In this embodiment, because the light sources are solid state light emitting elements, the control unit can control the pulses of the light sources to reduce the required switching speed of the DMD light valves, thereby reducing the difficulties in the DMD manufacturing process.

The brightness of the light source is determined by the pulse width of the light source. When the brightness (utilization efficiency) is different, the switching time of the DMD light valves are different. Shown below are the switching times of the DMD light valves for different light utilization efficiencies. Using 8-bit grayscale as an example, when the refresh rate per unit time is 60, and the light utilization efficiencies is x %, then the DMD switching time is: $(1-x\%)*(1/(60*3*8))$.

TABLE 1

| Technique | Light utilization efficiency | DMD switching time (µs) |
|---|---|---|
| Conventional technique | 100% | <5 |
| Implementation 1 of the embodiment | 90% | <69.4 |
| Implementation 2 of the embodiment | 80% | <138.9 |
| Implementation 3 of the embodiment | 70% | <208.3 |

From the above table it can be seen that, by using the control unit to control the length of the time intervals that the light sources are in the bright field, different required DMD switching speed can be realized. Regardless of the light output power of the embodiments, the required DMD switching speed of the embodiments of the present invention are far lower than that in conventional technologies.

Figure 4:
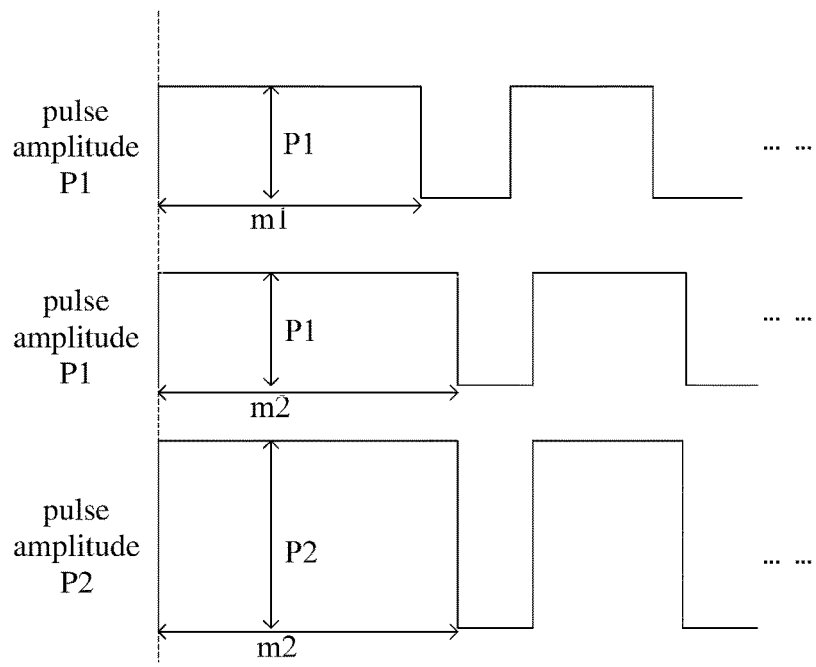
FIG. 4 is a schematic diagram illustrating the control of light pulses of the light source by the display control system according to the first embodiment.

In the above implementations, the light utilization efficiency is lower than 100%. To ensure the output brightness of the light source, in some embodiments, the control unit can control the pulse amplitude and/or pulse width of the light source to meet the different requirements of light output power or brightness. When the control unit controls the pulse width of the light source to be wider, the required switching speed of the DMD is higher, and when the control unit controls the pulse width of the light source to be narrower, the required switching speed of the DMD is lower. In other words, the control unit can realize different required switching speed of the DMD, and hence change the manufacturing difficulties for the DMD. As shown in FIG. 4, when the control unit controls the pulse width of the light source, the output brightness of the light source is clearly lower when the pulse width of the light source is m1 as compared to when it is m2 (m2>m1), because when the pulse width of the light source is m1, within each frame of data, the time durations when the light source is in the bright field is shorter than when the pulse width of the light source is m2 and the time duration when the light source is in the dark field is longer than when the pulse width of the light source is m2, and the DMD switching time is longer than when the pulse width of the light source is m2. When the control unit controls the pulse amplitude of the light source, as shown in FIG. 4, when the pulse widths remain unchanged, a light source with a pulse amplitude P1 has a lower brightness than that of a light source with a pulse amplitude P2 (P2>P1), i.e. the brightness of the light source with a pulse amplitude P1 is P1/P2 times the brightness of the light source with a pulse amplitude P2. In this embodiment, the output brightness of the light source does not change or is even higher while the required DMD switching speed is still lower. This not only simplifies the manufacturing process, but also improves the quality of the display device.

A second embodiment of the present is described with reference to FIG. 6. Differences between the second embodiment and the first embodiment include: The control unit controls the light sources to simultaneously emit lights including at least red, green and blue color lights; the spatial light modulator includes three DMDs, and the control unit controls the three DMDs to modulate simultaneously. The control of the light sources and the spatial light modulator by the control unit is described in more detail below. Of course, the light emitted by the light sources may include other color lights in addition to the red, green and blue lights, such as cyan and yellow lights, to enhance the color gamut.

Figure 6:
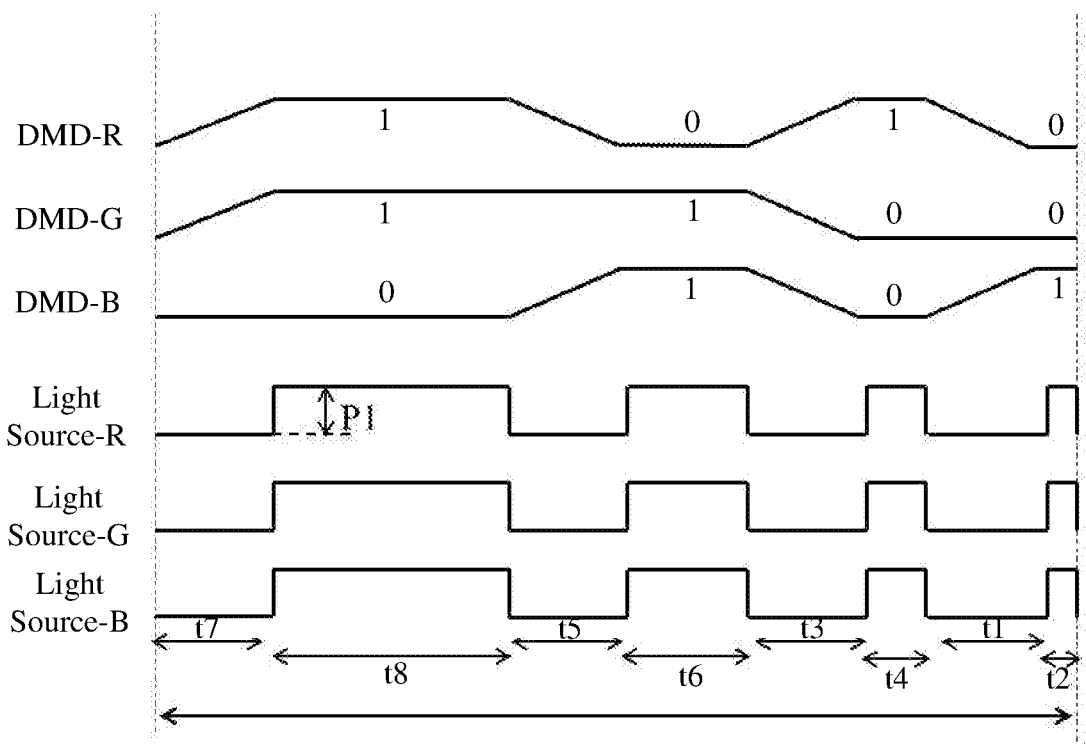
FIG. 6 is schematic diagram illustrating the control of multiple light sources and spatial light modulators by the display control system according to a second embodiment of the present invention.

As shown in FIG. 6, the light sources respectively emit red, green and blue lights, and the three DMDs correspondingly modulate the red, green and blue color lights. The control unit simultaneously controls all three color lights to alternately be in bright field and dark field, and controls the pulse widths and/or pulse amplitudes of the three color lights. The pulse widths and/or pulse amplitudes of the three color lights may be the same or different; when the output brightness of one color light is insufficient, the control unit can control the pulse width and pulse amplitude of that color light, without changing the other two color lights. This can generate better quality images. FIG. 6 only shows the situation where the pulse widths and pulse amplitudes of the three color lights are all the same. When the grayscale is 4 bits, the durations of time intervals t7, t5, t3 and t1 when the light sources are in the dark field are identical for the three color lights, where $t8=2^1*t6=2^2*t4=2^3*t2$. The situations of other grayscale sizes, or when the pulse widths or pulse amplitudes are different for the different colors, can be understood similarly by referring to the above embodiment of one DMD, and will not be described in more detail here. In this embodiment, DMD-R processes the red light emitted by Light Source-R, DMD-G processes the green light emitted by Light Source-G, DMD-B processes the blue light emitted by Light Source-B. The DMD-R, DMD-G and DMD-B in FIG. 6 only show one light valve in each respective DMD that respectively modulates the red, green and blue color light. The light valve of the DMD-R switches in time interval t7 when the Light Source-R is in the dark field and then stays in the On state during time interval t8 when the Light Source-R is in the bright field, switches in time interval t5 when the Light Source-R is in the dark field and then stays in the Off state during time interval t6, switches again in time interval t3 in the dark field and then stays in the On state during time interval t4, and then switches in time interval t1 in the dark field and then stays in the Off state during time interval t2. The switching of the light valve of the DMD-G and DMD-B respectively is also shown in FIG. 6 and will not be described in detail here.

In this embodiment, using 10-bit grayscale as an example, when the refresh rate per unit time is 60, and the light utilization efficiencies is x %, then the DMD switching time is: $(1-x\%)*(1/(60*10))$.

TABLE 1

| Technique | light utilization efficiency | DMD switching time (µs) |
| --- | --- | --- |
| Conventional technique | 100% | <10 |
| Implementation 1 of the embodiment | 90% | <208 |
| Implementation 2 of the embodiment | 80% | <417 |
| Implementation 3 of the embodiment | 70% | <625 |

Here, a light valve of a DMD may switch during a dark field interval, or not switch during a dark field interval; for a grayscale of N bits, each light valve of a DMD switches a maximum of N times. The display control system of embodiments of the present invention can control display of image data of M-bit grayscale, where M is a positive integer, such as 4, 5, 6, 7, 8, . . . . Compared to conventional technology, embodiments of the present invention greatly reduces the required switching speed of the DMD light valves, improves the light modulation precision of DMDs and significantly lowers the manufacturing difficulty for the DMDs; at the same time, it can increase the number of bits of the grayscale data that can be modulated by the spatial light modulator. Thus, in the present embodiments, the required switching speed of the DMDs is greatly reduced, and can realized grayscale display of more grayscale bits and increase the grayscale bits by a few times. The required DMD switching time is slower than in conventional technologies, so that the manufacturing difficulty of the DMD can be reduced while improving image display quality.

In the embodiments below, the light sources are sources that can be modulated; solid state light emitting elements are used as examples in this embodiment, but the invention is not limited to such.

Figure 7:
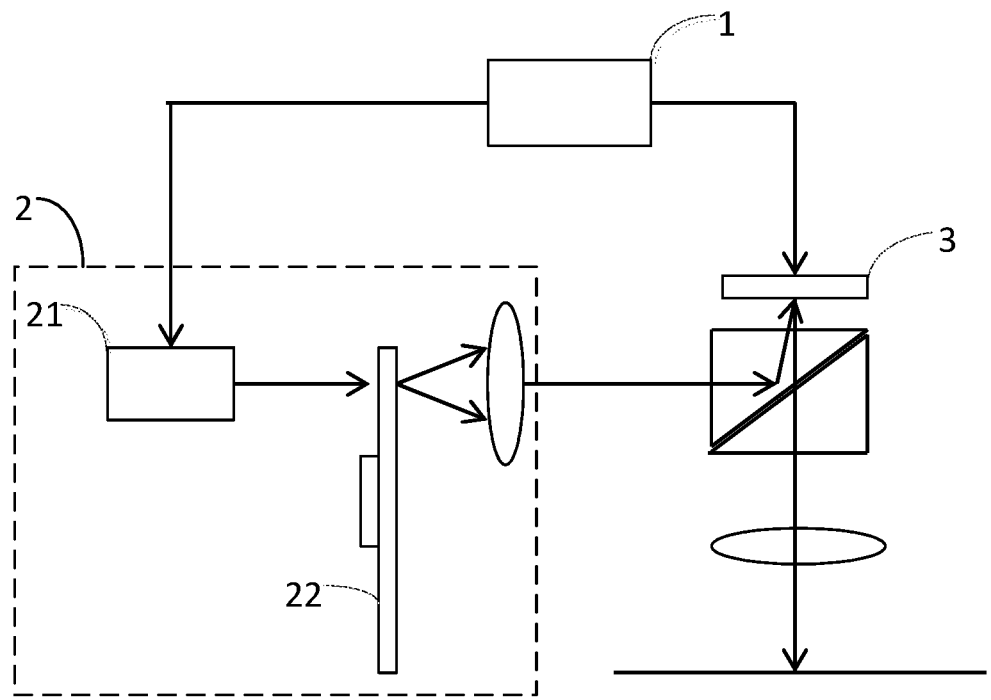
FIG. 7 schematically illustrates the structure of a display device according to a third embodiment of the present invention.
Figure 8:
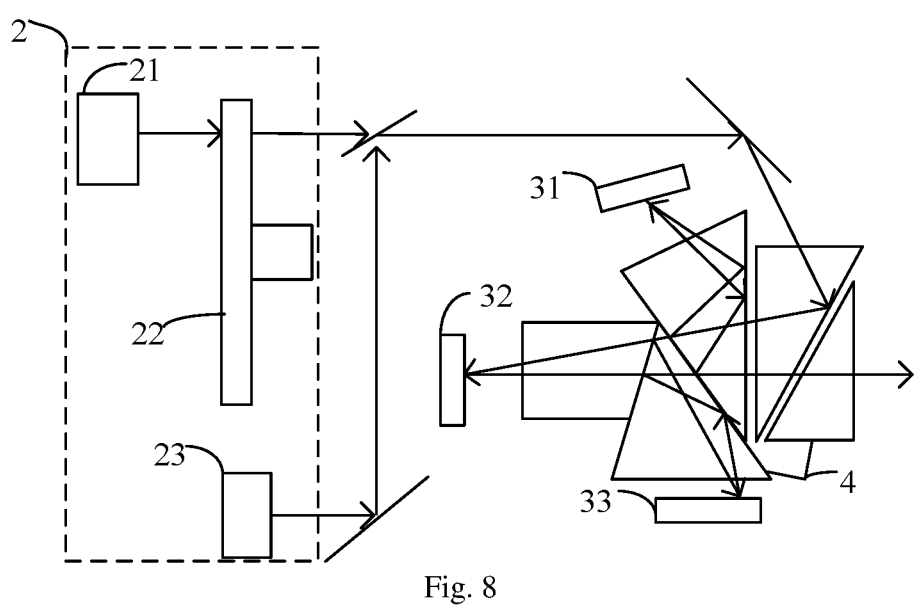
FIG. 8 schematically illustrates the structure of another display device according to the third embodiment of the present invention.

According to a third embodiment of the present invention, as shown in FIGS. 7 and 8, a display device includes: a light source 2, a display control system 1 and a spatial light modulator 3.

(1) The light source 2 is used to generate various color lights such as red, green, blue, yellow, cyan, magenta, etc. The number of light sources 2 is not limited, and typically depends on the practical need for the number of colors, etc.

As shown in FIG. 7, the light source 2 includes a solid state light emitting element 21 and a color wheel 22. The solid state light emitting element 21 may be one of LD and LED or a combination thereof, and may be single LD or LED, or an LD array or an LED array or an LD and LED combined array. The solid state light emitting element 21 emits an excitation light, which impinges on the color wheel 22, where the color wheel 22 includes multiple segments carrying wavelength conversion materials. The color wheel moves along a predetermined path, so that the excitation light illuminates different segments of the color wheel to generate converted lights of different colors.

In this embodiment, in accordance with modulation of the light source, the wavelength conversion materials are preferably materials that have relatively fast response rates. Phosphor materials currently available can typical meet such requirements. Of course, the wavelength conversion materials may also be materials other than phosphors, so long as their response times for wavelength conversion are shorter than the required On/Off switching time for the modulated light source. For example, a yellow phosphor can generate yellow light within a few tens to about a hundred nanoseconds after being excited. Correspondingly, the modulated light sources may be LED or LD.

As shown in FIG. 8, the light source 2 includes a solid state light emitting element 21 and a solid state light emitting element 23. The solid state light emitting element 21 generates an excitation light that impinges on the color wheel 22, where the color wheel has multiple segments carrying wavelength conversion materials. The color wheel 22 moves along a predetermined path so that the excitation light illuminates different segments of the color wheel to generate converted lights of different colors. The solid state light emitting element 23 generates lights that are different from the converted lights, to supplement the color gamut of the image display. Or, it generates a light which is the same as one color of the converted lights, in order to supplement the light of that color, to improve the color saturation of the image display.

Of course, the solid state light emitting elements may include one or more elements, without limitation, and the lights emitted by the solid state light emitting elements are not limited, and can include blue, UV, red, green light, etc.

In this embodiment, the light modulated by the spatial light modulator may be directly the light emitted by the solid state light emitting element, or a converted light emitted by the wavelength conversion material that are excited by the excitation light emitted by the solid state light emitting element. The converted light may include any one or more of the three primary color lights (red, green, blue), and can also include broad spectrum lights (yellow, cyan, magenta); the broad spectrum light can be processed by a light separation and combination device 4 before being inputted into the various spatial light modulators.

(2) The display control system 1 is used to control the light source and the spatial light modulator 3. The display control system 1 is a display control system of the first or second embodiment described above, and is not described in more detail here. The display control system 1 of this embodiment controls the solid state light emitting element of this embodiment to alternately be in bright field and dark field during each frame of data.

(3) The spatial light modulator 3 modulates the light generated by the light source, and outputs the modulated light to the projection lens. The embodiment may include one, two or three spatial light modulators 3, without limitation.

As shown in FIG. 7, one spatial light modulator is used, and the spatial light modulator 3 sequentially processes the time sequence of light generated by the color wheel. This way, the structure of the light source is simpler, and the control by the control unit 1 is simpler. When there is only one spatial light modulator, the spatial light modulator 3 may also sequentially processes the time sequence of light generated by the solid state light emitting elements or both the light generated by the solid state light emitting elements and the converted light generated by the color wheel, and the display control system 1 sequentially controls the solid state light emitting elements. This embodiment can improve the color gamut and the image display quality.

As shown in FIG. 8, three spatial light modulators are used, and the spatial light modulators 3 process the converted light generated by the color wheel and the light generated by the solid state light emitting element 23. The spatial light modulators 31, 32 and 33 may simultaneously modulate the lights, or sequentially modulate the lights. The same spatial light modulator may modulate lights of the same color or lights of different colors. When using three spatial light modulators to process the light generated by the light source, because the display control system a controls the light source, when the refresh rate of the image frames remains the same, the three spatial light modulators can simultaneously process the lights; this way, the modulation time for each color light is longer compared to only using one spatial light modulator, i.e., the time when the light source is in dark field is longer, so the required light valve switching speed is lower.

It will be apparent to those skilled in the art that various modification and variations can be made in the display control system and display device of the present invention without departing from the spirit or scope of the invention. Thus, it is intended that the present invention cover modifications and variations that come within the scope of the appended claims and their equivalents.

What is claimed is:

1. A display control system comprising:
a control unit for controlling a light source to be in a bright field during a plurality of bright field time intervals and a dark field during a plurality of dark field time intervals alternately within a same frame of data, wherein any two neighboring bright field time intervals are separated by only one dark field time interval and no other time intervals, the plurality of bright field time intervals and the plurality of dark field time intervals collectively constituting an entire duration of the frame of data, and controlling a switching of states of a light valve of a spatial light modulator to be within one or more of the plurality of dark field time intervals when the light source is in the dark field,
wherein the control unit controls a same primary color light source so that durations of its bright field time intervals are a geometric series within each frame of data.

2. The display control system of claim 1, wherein time durations of the plurality of dark field time intervals are of equal lengths.

3. The display control system of claim 1, wherein the control unit controls the light valve of the spatial light modulator to switch states or stay in a state during each of the plurality of dark field time intervals.

4. A display device comprising:
the display control system of claim 1;
at least one light source;
at least one spatial light modulator, for receiving and processing image data, and for receiving and modulating light generated by the light source, wherein the spatial light modulator includes multiple light valves.

5. The display device of claim 4, wherein the light source is one that can be modulated.

6. The display device of claim 5,
wherein the light source includes a solid state light emitting element and a color wheel;
wherein the solid state light emitting element emits an excitation light; and
wherein the color wheel includes a substrate carrying a wavelength conversion material, wherein the substrate moves along a predetermined path, and wherein the excitation light sequentially illuminates different locations of the wavelength conversion material.

7. The display device of claim 6, wherein the solid state light emitting element includes one of LD (laser diode) or LED (light emitting diode), or a combination thereof.

8. The display device of claim 5,
wherein the light source includes at least three solid state light emitting elements; and
wherein the least three solid state light emitting elements emit any one of red, green and blue color lights.

9. The display device of claim 8, wherein the solid state light emitting element includes one of LD (laser diode) or LED (light emitting diode), or a combination thereof.

10. The display device of claim 5,
wherein the light source includes a color wheel and at least two solid state light emitting elements;
wherein one of the solid state light emitting elements emits an excitation light, and wherein the color wheel is located on a light path of the excitation light for receiving the excitation light to generate a converted light; and
wherein light generated by the one of the solid state light emitting elements is modulated by the spatial light modulator.

11. The display device of claim 10, wherein the solid state light emitting element includes one of LD (laser diode) or LED (light emitting diode), or a combination thereof.

12. The display device of claim 5,
wherein the at least one spatial light modulator is one spatial light modulator, and
wherein the display control system controls the light source to generate three color lights including red, green and blue lights, and controls the spatial light modulator to sequentially modulate the three color lights including the red, green and blue lights.

13. The display device of claim 5,
wherein the at least one spatial light modulator are three spatial light modulators;
wherein the display control system controls the light source to generate broad spectrum lights or primary color lights, wherein the primary color lights, or primary color lights generated from the broad spectrum lights by light division and combination, are respectively inputted to the three spatial light modulators; and
wherein the spatial light modulators modulate the received primary color lights based on grayscale values of the respective primary colors in each frame of data.

14. The display control system of claim 1, wherein the geometric series formed by all of the bright field time intervals within each frame of data is an increasing or decreasing geometric series.

* * * * *